(12) United States Patent
Acosta et al.

(10) Patent No.: US 7,638,589 B2
(45) Date of Patent: Dec. 29, 2009

(54) TRIAZOLE-CONTAINING FLUOROCARBON-GRAFTED POLYSILOXANES

(75) Inventors: Erick Jose Acosta, New Castle, DE (US); Axel Hans-Joachim Herzog, West Chester, PA (US); Martial Jean-Jacques Pabon, Neauphlette (FR)

(73) Assignee: E. I. Du Pont De Nemours and Company, Wilmington, DE (US)

( * ) Notice: Subject to any disclaimer, the term of this patent is extended or adjusted under 35 U.S.C. 154(b) by 611 days.

(21) Appl. No.: 11/311,077

(22) Filed: Dec. 19, 2005

(65) Prior Publication Data

US 2007/0141363 A1   Jun. 21, 2007

(51) Int. Cl.
    C08G 77/08   (2006.01)
(52) U.S. Cl. ............................ 528/19; 528/28; 528/42
(58) Field of Classification Search ............... 528/19, 528/28, 42
    See application file for complete search history.

(56) References Cited

U.S. PATENT DOCUMENTS

| | | | |
|---|---|---|---|
| 3,818,064 | A | 6/1974 | Kim |
| 3,903,123 | A | 9/1975 | Deiner et al. |
| 3,949,136 | A | 4/1976 | Deiner et al. |
| 4,210,697 | A * | 7/1980 | Adiletta .................. 442/87 |
| 4,488,771 | A | 12/1984 | Koford |
| 4,992,786 | A | 2/1991 | Kirkland |
| 5,141,788 | A | 8/1992 | Badesha et al. |
| 5,166,031 | A | 11/1992 | Badesha et al. |
| 5,618,520 | A | 4/1997 | Hansenne et al. |
| 6,491,981 | B1 | 12/2002 | Guichard et al. |
| 6,503,313 | B2 | 1/2003 | Matakawa et al. |
| 2001/0002416 | A1 | 5/2001 | Matakawa et al. |
| 2003/0065117 | A1 | 4/2003 | Poreddy et al. |
| 2005/0022313 | A1 | 2/2005 | Scheidler |
| 2006/0052556 | A1 | 3/2006 | Franchina et al. |

FOREIGN PATENT DOCUMENTS

| | | |
|---|---|---|
| DE | 2361976 | 6/1974 |
| GB | 2116190 | 9/1983 |
| JP | 03059016 | 3/1991 |
| JP | 1993156022 A | 6/1993 |
| JP | 1995233257 A | 9/1995 |
| JP | 1995233258 A | 9/1995 |
| JP | 1998036755 A | 2/1998 |
| JP | 1998330437 A | 12/1998 |
| JP | 1999060956 A | 3/1999 |
| JP | 1999181412 A | 7/1999 |
| JP | 1999236532 A | 8/1999 |
| JP | 2000119354 A | 4/2000 |
| JP | 2000119355 A | 4/2000 |
| JP | 2000119634 A | 4/2000 |
| JP | 2000128989 A | 5/2000 |
| JP | 2002053848 A | 2/2002 |
| SU | 293037 | 5/1971 |
| WO | WO 00/00559 | 1/2000 |

OTHER PUBLICATIONS

Boutevin et al. Synthesis of fluorinated polysiloxanes. 8. Properties at low and high temperature of polysiloxanes with fluorinated grafts. Macromolecules (1991), 24(3), 629-32; Ec. Natl. Super.Chim., Montpellier, 34075, Fr.

Boileau et al. Fluorinated polysiloxanes. A basis for low surface energy materials. European Coatings Journal (1996), (7-8), 508, 510-513. Vincentz.

Abstract—Beyou et al. New Low surface energy materials based on fluorinated polysiloxanes. Silicones in Coatings, 2$^{nd}$ Conference in the Series: High Performance Coating Materials, Brussels, Jan. 29-31, 1996, Paper 23/1-10. Paint Research Association, Teddington, Uk.

Abstract—Grainger, et al. Perfluoro-grafted polysiloxanes as immobilized monolayers: Interfacial properties for perfluoroethers versus perfluoroalkyls. Book of Abstracts, 213$^{th}$ ACS National Meeting, San Francisco, Apr. 13-17, 1997, POLY-486. American Chemical Society, Washington, DC.

(Continued)

*Primary Examiner*—Margaret G Moore
(74) *Attorney, Agent, or Firm*—Nancy S. Mayer

(57) ABSTRACT

A polymer for imparting repellency and stain resistance to substrates is disclosed of Formula 1:

$$(W)_a(R^2)_b Si(R^1)_2 —O—[Si(R^1)_2 —O]_n —[Si(W)_c(R^1)_d (R^2)_e —O]_m —Si(R^1)_2 —(W)_f(R^2)_g \quad\quad 1$$

wherein:

a, b, c, d, e, f and g are each independently 0 or 1, provided that (a+b) is 1, (f+g) is 1, and (c+d+e) is 2, each $R^1$ is a $C_1$ to $C_8$ alkyl, each $R^2$ is independently H or $C_1$ to $C_8$ alkyl, optionally containing oxygen, nitrogen, or sulfur, or a combination thereof, and n=0 to 500, m=1 to 100, each W is independently $$(R_f—X—A—X)_p —Y—X—$$

wherein:

$R_f$ is a straight or branched perfluoroalkyl group having from about 2 to about 20 carbon atoms, or a mixture thereof, which is optionally interrupted by at least one oxygen atom, each X is independently an organic divalent linking group having from about 1 to about 20 carbon atoms, optionally containing oxygen, nitrogen, or sulfur, or a combination thereof, A is a 1,2,3-triazole, p=1 to 2, Y is O, N, or NR wherein R is H or $C_1$ to $C_{20}$ alkyl, optionally containing oxygen, nitrogen, or sulfur, or a combination thereof.

16 Claims, No Drawings

OTHER PUBLICATIONS

Grainger et al. Perfluoro-grafted polysiloxanes as immobilized monolayers: interfacial properties for perfluoroethers versus perfluoroalkyls. Polymer Preprints (1997), 38(1), 949-950. American Chemical Society, Division of Polymer Chemistry.

Abstract—Grainger et al. Grafted polysiloxanes immobilized as polymer monolayers: Modifying interfacial properties with side chain chemistry. Book of Abstracts, 214$^{th}$ ACS National Meeting, Las Vegas, NV, Sep. 7-11, 1997, PMSE-334. American Chemical Society, Washington, DC.

Grainger et al. Grafted polysiloxanes immobilized as polymer monolayers: Modifying interfacial properties with side chain chemistry. Polymeric Materials Science and Engineering (1997), 77, 587. American Chemical Society.

Suzuki et al. Synthesis of polydimethylsiloxane-grafted fluoropolymers and properties of hydrophobic coating materials. Polymer Journal (Tokyo) (2000), 32(5), 447-451. Society of Polymer Science, Japan.

Abstract—Suzuki et al. Synthesis of polysiloxane-grafted fluoropolymers and their hydrophobic properties. Nippon Setchaku Gakkaishi (2000), 36(6), 217-224. Nippon Setchaku Gakkaishi.

Suzuki et al. Synthesis of polysiloxane-grafted fluoropolymers and their hydrophobic properties. Journal of Applied Polymer Science (2000), 78(11), 1955-1963. John Wiley & Sons, Inc.

Kobayaski et al. Sliding properties of water droplets on poly(dimethylsiloxane) grafted fluoropolymers coatings. Koen Yoshishu—Nippon Setchaku Gakkai Nenji Taikai (2000), 38$^{th}$, 201-202. Nippon Setchaku Gakkai.

Liu et al. Allyl p-fluor cinnamate grafted polysiloxane photoalignment films polymerized under linear polarized IV light. Thin Solid Films (2001), 384(2), 212-214. Elsevier Science S.A.

Furukawa et al. Water and oil repellency of polysiloxanes with highly fluorinated alkyl side chains. Journal of Applied Polymer Science (2003), 87(7), 1085-1091. John Wiley & Sons, Inc.

Buese et al. Poly(dimethylsiloxane) -graft-oligo (hexafluoropropeneoxide) via ring-opening polymerization. ACS Symposium Serices (2003), 838 (Synthesis and Properties of Silicones and Silicone-Modified Materials), 306-317. American Chemical Society.

Stempf et al. Fluorinated Acrylics as an Alternative for Hydrophobic and Oleophobic Coating for Stone and Concrete. J. M. Int. J. Restoration Buildings & Monuments 1999, 5, 273-288.

* cited by examiner

TRIAZOLE-CONTAINING FLUOROCARBON-GRAFTED POLYSILOXANES

FIELD OF THE INVENTION

The present invention relates to triazole-containing fluorocarbon-grafted polysiloxanes which impart oil repellency, alcohol repellency, water repellency and stain resistance to treated substrates.

BACKGROUND OF THE INVENTION

Various compositions are known to be useful as treating agents to provide surface effects to substrates. Surface effects include repellency to moisture, soil, and stains, and other effects, which are particularly useful for fibrous substrates and other substrates such as hard surfaces. Many such treating agents are fluorinated polymers or copolymers.

Siloxane- and fluorochemical-based compositions have been disclosed for the protection of hard substrate surfaces, e.g., mineral substrates, and for soft substrate surfaces, such as fibrous substrates. While siloxane-based treatments provide water repellency at a relatively low price per square meter and with good weathering resistance, they are marginal in oil repellency (for instance, see Stempf, A.; Muller, P.; Pabon, M.; Corpart, J. M. Int. J. Restoration Buildings & Monuments 1999, 5, 273-288). Fluorochemical-based treatments provide both oil and water repellency but are relatively expensive due to the necessary high fluorine content.

U.S. Pat. No. 6,503,313 disclosed a graft copolymer of a fluoro-polymer having at least one urethane linkage and containing at least one radically polymerizable unsaturated bond moiety and at least one polysiloxane, of which one terminal group was radically polymerizable. The compositions containing this graft copolymer composition are suitable for use as a coating having oil repellent, water repellent and stain resistant properties over a long period of time.

Most commercially available fluorinated polymers that are useful as treating agents for imparting repellency to substrates contain predominantly eight or more carbons in the perfluoroalkyl chain to provide the desired repellency properties. It is desirable to reduce the chain length of the perfluoroalkyl groups thereby reducing the amount of fluorine present, while still achieving the same or superior surface effects. There is a need for polymer compositions which significantly improve the repellency and stain resistance of fluorinated polymer treating agents for fibrous substrates and hard surface substrates while using lower levels of fluorine. The present invention provides such compositions.

SUMMARY OF THE INVENTION

The present invention comprises a composition comprising a graft polymer of Formula 1:

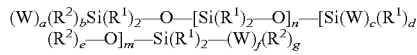

wherein:

a, b, c, d, e, f and g are each independently 0 or 1, provided that (a+b) is 1, (f+g) is 1, and (c+d+e) is 2, each $R^1$ is a $C_1$ to $C_8$ alkyl, each $R^2$ is independently H or $C_1$ to $C_8$ alkyl, optionally containing oxygen, nitrogen, or sulfur, or a combination thereof, and n=0 to 500, m=1 to 100, each W is independently

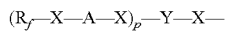

wherein:

$R_f$ is a straight or branched perfluoroalkyl group having from about 2 to about 20 carbon atoms, or a mixture thereof, which is optionally interrupted by at least one oxygen atom, each X is independently an organic divalent linking group having from about 1 to about 20 carbon atoms, optionally containing oxygen, nitrogen, or sulfur, or a combination thereof, A is a 1, 2, 3-triazole, P=1 to 2, Y is O, N, S, carboxyl, urea, urethane, ether, beta-hydroxy ether, or NR wherein R is independently H or $C_1$ to $C_{20}$ alkyl, optionally containing oxygen, nitrogen, or sulfur, or a combination thereof.

The present invention further comprises a composition comprising Formula 2:

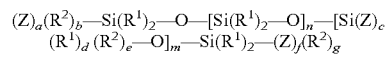

wherein:

a, b, c, d, e, f and g are each independently 0 or 1, provided that (a+b) is 1, (f+g) is 1, and (c+d+e) is 2, each Z is independently:

$R^1$, $R^2$, n, m, p, X and Y are as defined above for Formula 1.

The present invention further comprises a method of providing water repellency, alcohol repellency, oil repellency, and stain resistance to substrates comprising contacting the substrate with a composition of Formula 1 as defined above.

The present invention further comprises substrates treated with a composition of Formula 1 as defined above.

DETAILED DESCRIPTION OF THE INVENTION

All trademarks are denoted herein by capitalization.

The present invention provides compounds combining the advantages of siloxanes and triazole-containing fluorinated compounds and having improved fluorine efficiency. By "fluorine efficiency" is meant the ability to use a minimum amount of fluorochemical to obtain the desired surface effect, such as repellency properties or stain resistance, when applied to substrates, or to obtain better performance using the same level of fluorine. A polymer having a high fluorine efficiency generates the same or greater level of surface effect using a lower amount of fluorine than a comparative polymer. The fluorocarbon-grafted polysiloxanes of the present invention contain a reduced chain length in the perfluoroalkyl groups thereby reducing the amount of fluorine present, while still achieving the same or superior surface effects.

The present invention comprises a composition comprising a graft polymer of Formula 1:

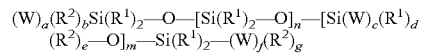

wherein:

a, b, c, d, e, f and g are each independently 0 or 1, provided that (a+b) is 1, (f+g) is 1, and (c+d+e) is 2, each $R^1$ is a $C_1$ to $C_8$ alkyl, each $R^2$ is independently H or $C_1$ to $C_8$ alkyl, optionally containing oxygen, nitrogen, or sulfur, or a combination thereof, and n=0 to 500, m=1 to 100, each W is independently

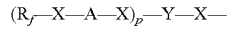

wherein:

$R_f$ is a straight or branched perfluoroalkyl group having from about 2 to about 20 carbon atoms, or a mixture thereof, which is optionally interrupted by at least one oxygen atom, each X is independently an organic divalent linking group having from about 1 to about 20 carbon atoms, optionally containing oxygen, nitrogen, or sulfur, or a combination thereof, A is a 1,2,3-triazole, p=1 to 2, Y is O, N, S, carboxyl, urea, urethane, ether, beta-hydroxy ether, or NR wherein R is independently H or $C_1$ to $C_{20}$ alkyl, optionally containing oxygen, nitrogen, or sulfur, or a combination thereof.

Preferably $R_f$ is a straight or branched perfluoroalkyl group having from about 4 to 20 carbon atoms, more preferably from about 4 to about 12 carbon atoms, or a mixture thereof, optionally interrupted by at least one oxygen atom. More preferably $R_f$ is a perfluoroalkyl radical having the formula $F(CF_2CF_2)_n$— wherein n is 1 to about 10, or mixtures thereof.

Examples of suitable linking groups X include straight chain, branched chain or cyclic alkylene, phenyl, arylene, aralkylene, amide, ester, sulfonyl, sulfoxy, sulfonamido, carbonamido, carbonyloxy, beta-hydroxy ether, urethanylene, ureylene, and combinations thereof such as sulfonamidoalkylene.

A is preferably 1,4- or 1,5-disubstituted triazole.

Examples of preferred groups Y are O, N, S, carboxyl, urea, urethane, ether, beta-hydroxy ether, NR, $N(R)_2NR$, or $N(R)_2$ wherein R is independently H, or $C_1$ to $C_4$ alkyl;

The compounds of Formula 1 are prepared by first contacting a poly(dialkylsiloxane) having amine-terminated side chain(s) and/or amine-terminal end group(s) with a base and an alkyl or aryl bromide containing a terminal acetylenic triple bond to produce an intermediate composition of aliphatic or aromatic alkyne having Formula 2:

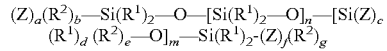

wherein:

a, b, c, d, e, f and g are each independently 0 or 1, provided that (a+b) is 1, (f+g) is 1, and (c+d+e) is 2, each Z is independently

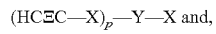

$R^1$, $R^2$, n, m, p, X and Y are as defined above for Formula 1.

The intermediate composition of aliphatic or aromatic alkyne of Formula 2 prepared above is charged in a dipolar cycloaddition reaction with a fluorinated alkyl azide in the presence of a suitable catalyst, preferably copper metal or copper sulfate with sodium ascorbate, wherein Cu(I) is the catalytic species. The alkyne can be substituted with at least one alcohol and/or amino group, or combinations thereof. The degree of the incorporation of aliphatic or aromatic alkyne of Formula 2 into the polysiloxane depends on the amount of Formula 2 introduced in the reaction, and can be maximized by an using excessive amount of Formula 2. Correspondently, the degree of the incorporation of triazole-containing fluoroalkyl groups in the polysiloxane depends on the amount of the fluorinated alkyl azide used in the reaction with the alkyne groups above. The degree of the incorporation of the triazole-containing fluoroalkyl groups into the polysiloxane of Formula 1 of this invention is maximized by using excessive fluorinated alkyl azide to substitute the alkyne group. The reaction is conducted at a temperature of from about 25° C. to about 100° C. Preferably no solvent is employed, but suitable solvents include tetrahydrofuran, methyl isobutyl ketone, acetone, isopropanol, ethanol, methanol or water.

In one particular embodiment of the present invention, the bromide-containing acetylenic triple bond suitable for the reaction in the present invention is propargyl bromide. An amino-terminated polydimethylsiloxane (such as WACKER PDMS 3345, available from Wacker-Chemie GmbH, Wacker Silicones, Munich, Germany of formula $NH_2(CH_2)_3$—$Si(R^1)_2$—O—$[Si(R^1)_2$—O$]_n$—$[Si(CH_3)(R^1)$—O$]_m$—$Si(R^1)_2$—$(CH_2)_3NH_2$, wherein, n and m are each defined as for Formula 1 above), and diisopropylethylamine are dissolved in tetrahydrofuran. The reaction mass was cooled with an ice bath. A solution of 56% propargyl bromide in toluene is added dropwise to the reaction while agitating vigorously. The reaction is allowed to continue for several hours overnight at 45° C. Then, the reaction mixture is filtered and the solvent evaporated under vacuum. The resulting material is a dark yellow oil that is washed three times with water. The washed product is dissolved again in tetrahydrofuran and dried over magnesium sulfate. The solvent is evaporated under vacuum to obtain a dark yellow oil in 88% yield. The product is an amino-terminated tetrapropargyl polydimethylsiloxane containing two propargyl groups attached to each amine of the above polydimethylsiloxane of formula: $NH_2(CH_2)_3$—$Si(CH_3)_2$—O—$[Si(CH_3)_2O]_n$—$Si(CH_3)_2$—$(CH_2)_3NH_2$. Perfluorohexylethyl azide, the tetrapropargyl polysiloxane prepared above and copper turnings are dissolved in isopropanol and reacted. The reaction mass is stirred vigorously and temperature increased to 60° C. After 24 hours, the reaction is cooled to ambient temperature and solids filtrated. Then, solvent and excess of perfluorohexylethyl azide are evaporated under vacuum to obtain a $C_6$-fluorinated tetratriazole polydimethylsiloxane in 83% yield as dark brown wax-like material. The fluorinated product of $C_6$-fluorinated tetratriazole polydimethylsiloxane is a triazole-containing fluorocarbon-grafted polysiloxane of the present invention of Formula 1.

The tetratriazole polydimethylsiloxane of Formula 1 of the present invention is low in fluorine content by weight (15% w/w fluorine) and exhibits good solubility in organic solvents. This polymer is able to self-disperse in acidic water allowing the formulation of aqueous emulsions that are stable for extended period of time (6 months at least).

In another particular embodiment of the present invention, an amino-terminated polydimethylsiloxane (such as WACKER 65000 VP, available from Wacker-Chemie GmbH, Wacker Silicones, Munich, Germany of formula $CH_3Si(CH_3)_2$—O—$[Si(CH_3)_2$—O$]_n$—$[Si((CH_2)_3NH(CH_2)_2NH_2)(CH_3)$—O$]_m$—$Si(CH_3)_2CH_3$, wherein, n and m are each defined as for Formula 1 above) is used in the reaction according to the procedure described above. The resulting fluorinated triazole-containing polydimethylsiloxane is a triazole-containing fluorocarbon-grafted polysiloxane of Formula 1 of the present invention.

The final product for application to a substrate is a dispersion (if water based) or a solution (if solvents other than water are used) of the triazole-containing fluorocarbon-grafted polysiloxanes of the present invention.

For application to substrates, the triazole-containing fluorocarbon-grafted polysiloxanes of the present invention are diluted with water, or further dispersed or dissolved in a solvent selected from the groups comprising simple alcohols, ethers and ketones that are suitable as the solvent for final application to substrates (hereinafter the "application solvent").

Alternatively, an aqueous dispersion of the composition of the present invention is made by conventional methods with surfactants. It is prepared by removing solvents by evaporation and the use of emulsification or homogenization procedures known to those skilled in the art. Such solvent-free emulsions are preferred for application to substrates to minimize flammability and volatile organic compounds (VOC) concerns.

The present invention further comprises a method of providing water repellency and alcohol repellency to a substrate comprising contacting the substrate with triazole-containing fluorocarbon-grafted polysiloxane solutions or dispersion of Formula 1:

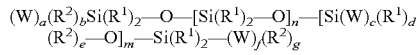

wherein:

a, b, c, d, e, f and g are each independently 0 or 1, provided that (a+b) is 1, (f+g) is 1, and (c+d+e) is 2, each $R^1$ is a $C_1$ to $C_8$ alkyl, each $R^2$ is independently H or $C_1$ to $C_8$ alkyl, optionally containing oxygen, nitrogen, or sulfur, or a combination thereof, and n=0 to 500, m=1 to 100, each W is independently

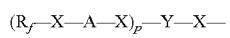

wherein:

$R_f$ is a straight or branched perfluoroalkyl group having from about 2 to about 20 carbon atoms, or a mixture thereof, which is optionally interrupted by at least one oxygen atom, each X is independently an organic divalent linking group having from about 1 to about 20 carbon atoms, optionally containing oxygen, nitrogen, or sulfur, or a combination thereof, A is a 1,2,3-triazole, p=1 to 2, Y is O, N, S, carboxyl, urea, urethane, ether, beta-hydroxy ether, or NR wherein R is independently H or $C_1$ to $C_{20}$ alkyl, optionally containing oxygen, nitrogen, or sulfur, or a combination thereof.

Suitable substrates include fibrous or hard surface substrates as defined below. The triazole-containing fluorocarbon-grafted polysiloxane solution or dispersion of the present invention is applied to the substrate by any suitable method. Such methods include, but are not limited to, application by exhaustion, foam, flex-nip, nip, pad, kiss-roll, beck, skein, winch, liquid injection, overflow flood, roll, brush, roller, spray, dipping, immersion, and the like. It can also be applied by use of the beck dyeing procedure, continuous dyeing procedure or thread-line application.

The triazole-containing fluorocarbon-grafted polysiloxane solution or dispersion of this invention is applied to the substrate as such, or in combination with other optional textile finishes or surface treating agents. Such optional additional components include treating agents or finishes to achieve additional surface effects, or additives commonly used with such agents or finishes. Such additional components comprise compounds or compositions that provide surface effects such as no iron, shrinkage control, wrinkle free, permanent press, moisture control, softness, strength, anti-slip, anti-static, anti-snag, anti-pill, soil release, odor control, antimicrobial, sun protection, and similar effects. One or more such treating agents or finishes can be applied to the substrate before, after, or simultaneously with the copolymer of the present invention. For example for fibrous substrates, when synthetic or cotton fabrics are treated, use of a wetting agent can be desirable, such as ALKANOL 6112 available from E.I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes may also be present such as surfactants, antioxidant, light fastness agent, color fastness agent, pH adjusters, cross linkers, wetting agents, hydrocarbon extenders, wax extenders, foaming agent, processing aid, lubricant, blocked isocyanate, combinations thereof, and other additives known by those skilled in the art. Suitable surfactants include anionic, cationic, and nonionic. Preferred is an anionic surfactant such as sodium lauryl sulfonate, available as DUPONOL WAQE from Witco Corporation, Greenwich, Conn. Examples of such finishes or agents include processing aids, foaming agents, lubricants, anti-stains, and the like. The composition is applied at a manufacturing facility, retailer location, or prior to installation and use, or at a consumer location.

Application rates for the triazole-containing fluorocarbon-grafted polysiloxane solution or dispersion of the present invention are in the range of from about 0.05 to about 5 g/m² of fluorine, preferably 0.1 to 3 g/m² of fluorine, more preferably 0.2 to 2 g/m² of fluorine. A treated fibrous substrate typically has a fluorine content of from about 0.05% to about 1.0% by weight, preferably 0.05 to 0.5%, more preferably 0.1 to 0.3%.

Optionally a blocked isocyanate to further promote durability is added with the composition of Formula 1 (i.e., as a blended isocyanate). An example of a suitable blocked isocyanate to use in the present invention is HYDROPHOBOL XAN available from Ciba Specialty Chemicals, High Point, N.J. Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight can be added.

Optionally, nonfluorinated extender compositions are also included in the application composition to potentially further increase fluorine efficiency. Examples of such optional additional extender polymer compositions are those disclosed in co-pending U.S. Ser. No. 11/175,545, filed Sep. 7, 2004 U.S. Pat. No. 7,344,758, and in U.S. Ser. No. 11/175,680 filed Jul. 6, 2005 (CH3048).

The optimal repellent treatment for a given substrate depends on (1) the characteristics of the fluorinated polymer, (2) the characteristics of the surface of the substrate, (3) the amount of fluorinated polymer applied to the surface, (4) the method of application of the fluorinated polymer onto the surface, and many other factors. Some fluorinated polymer repellents work well on many different substrates and are repellent to oil, water, and a wide range of other liquids. Other fluorinated polymer repellents exhibit superior repellency on some substrates or require higher loading levels.

The present invention also comprises substrates treated with the triazole-containing fluorocarbon-grafted polysiloxane solution or dispersion of the present invention. Suitable substrates include fibrous or hard surface substrates. The fibrous substrates include woven and nonwoven fibers, yarns, fabrics, fabric blends, textiles, nonwovens, paper, leather, and carpets. These are made from natural or synthetic fibers including cotton, cellulose, wool, silk, polyamide, polyester, polyolefin, polyacrylonitrile, polyaramid, polypropylene, rayon, nylon, acrylic, aramid, acetate, jute, sisal, seagrass, coir, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. The hard surface substrates include porous and non-porous mineral surfaces, such as glass, stone, masonry, concrete, unglazed tile, brick, porous clay and various other substrates with surface porosity. Specific examples of such substrates include unglazed concrete, brick, tile, stone (including granite and limestone), grout, mortar, marble, limestone, statuary, monuments, wood, composite materials such as terrazzo, and wall and ceiling panels including those fabricated with gypsum board. These are used in the construction of buildings, roads, parking ramps, driveways, floorings, fireplaces, fireplace hearths, counter tops, and other decorative uses in interior and exterior applications.

The triazole-containing fluorocarbon-grafted polysiloxane compositions of the present invention are useful to provide one or more of excellent water repellency, alcohol repellency, oil repellency, and stain resistance to treated substrates. This excellent water-, alcohol-, oil-, and stain resistance is obtained using lower fluorine concentrations compared with conventional perfluorocarbon surface treatment agents, providing improved "fluorine efficiency" in the protection of the treated surfaces. The triazole-containing fluorocarbon-grafted polysiloxanes of the present invention are effective at fluorine concentrations about one half to one third of the fluorine concentration for conventional fluorochemical surface protectants. As an example of this improved fluorine efficiency, the triazole-containing fluorocarbon-grafted polysiloxane of the present invention having a fluorine content of about 15% of the dry polymer by weight, provided similar or increased water, alcohol, and oil repellency, soil resistance and stain resistance to test substrates compared to substrates treated with a conventional surface protectant dispersion of a perfluoroalkyl polymer, having a fluorine content of about 45% by weight. The triazole-containing fluorocarbon-grafted polysiloxanes of the present invention also allow for the use of shorter fluoroalkyl groups containing 6 or fewer carbon atoms while conventional commercially perfluoroalkyl polymer not containing triazole typically show poor oil repellency and water repellency performance if the fluoroalkyl groups contain less 8 carbon atoms.

TEST METHODS

Test Method 1—Fabric Treatment

The fabric was treated with the polymer dispersion or solution using a pad bath (dipping) process. A bath containing 0.2 to 2% of the fluorinated product, as detailed in the Tables in the Examples, was used to treat fabric substrates, often in combination with a blocked extender (0 to 2%) and/or a softener (0 to 2%) as specified in the tests. A wetting agent was also included in the bath at 0.2% for nylon fabrics. After application, the fabric was optionally dried and cured at approximately 160° C. for 1-3 minutes. The fabric was allowed to cool down to room temperature after treatment and cure.

Test Method 2—Water Repellency

The water repellency of a treated substrate was measured according to AATCC standard Test Method No. 193-2004 and the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the substrate and the extent of surface wetting is determined visually. The test provides a rough index of aqueous stain resistance. The higher the water repellency rating, the better the resistance of a finished substrate to staining by water-based substances.

The composition of water repellency test liquids is shown in table 1.

TABLE 1

| Water Repellency Test Liquids | | |
|---|---|---|
| Water Repellency Rating Number | Composition, Isopropyl Alcohol | Vol % Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Three drops of Test Liquid 1 are placed on the treated substrate. After 10 seconds, the drops are removed by using vacuum aspiration. If no liquid penetration or partial absorption (appearance of a darker wet patch on the substrate) is observed, the test is repeated with Test Liquid 2. The test is repeated with Test Liquid 3 and progressively higher Test Liquid numbers until liquid penetration (appearance of a darker wet patch on the substrate) is observed. The test result is the highest Test Liquid number that does not penetrate into the substrate. Higher scores indicate greater repellency.

Test Method 3—Oil Repellency

The treated fabric samples were tested for oil repellency by a modification of AATCC standard Test Method No. 118, conducted as follows. A fabric sample, treated with an aqueous dispersion of polymer as previously described, is maintained for a minimum of 2 hours at 23° C.+20% relative humidity and 65° C.+10% relative humidity. A series of organic liquids, identified below in Table 2, are then applied dropwise to the fabric samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the fabric is the highest numbered test liquid for which two of the three drops remained spherical to hemispherical, with no wicking for 30 seconds. In general, treated fabrics with a rating of 5 or more are considered good to excellent; fabrics having a rating of one or greater can be used in certain applications.

The treated samples of hard surface substrates were tested for oil repellency by a modification of AATCC standard Test Method No. 118, conducted as follows. Three drops of Test Oil 1 in Table 2 are placed on the treated substrate. After 30 s, the drops are removed by using vacuum aspiration. If no liquid penetration or partial absorption (appearance of a darker wet patch on the substrate) is observed, the test is repeated with Test Oil 2. The test is repeated with Test Oil 3 and progressively higher Test Oil numbers until liquid penetration (appearance of a darker wet patch on the substrate) is observed. The test result is the highest Test Oil number that does not show liquid penetration into the substrate.

TABLE 2

Oil Repellency Test Liquids

| Oil Repellency Rating Number | Test Solution |
| --- | --- |
| 1 | NUJOL Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Saybolt viscosity of 360/390 at 38° C. and a specific gravity of 0.880/0.900 at 15° C.

Test Method 4—Stain Test

Stain testing was conducted on the indicated samples using the following procedure. Samples of treated and untreated (control) substrate are prepared and dried for 16 to 48 h at room temperature. Droplets of selected commercially available products are used to stain the substrates. Stains are applied to the treated surface and allowed to stay in contact with the substrate for 24 h at room temperature. The stains and sources are shown in Table 3.

A scrubbing brush is passed 50 times (50 strokes) over the substrate, using a pressure of 0.6 N/cm$^2$. The substrate is rinsed with tap water and then deionized water before the stain is evaluated. The surface where the strain droplets were applied is rated according to the following criteria shown in Table 4. A lower number indicates greater stain resistance.

TABLE 3

| Stains | |
| --- | --- |
| Stain | Manufacturer |
| Coffee (black) | FOLGERS, Proctor and Gamble, Cincinnati, OH |
| Pfeiffer Salad Dressing | T. Marzetti, Columbus, OH |
| Ketchup (Heinz) | Heinz, Pittsburg, PA |
| Cola | COCA-COLA, Atlanta, GA |
| Mustard | Plochman's, Manteno, IL |
| Grape Juice (purple) | Welch's, Concord, MA |
| Lemon Juice | Concord Foods, Brockton, MA |

TABLE 3-continued

| Stains | |
| --- | --- |
| Stain | Manufacturer |
| Wesson Oil (soybean) | Conagra Foods, Omaha, NE |
| Bacon Grease | Hatfield, Hatfield, PA |

TABLE 4

Stain Scores

| Score | Description |
| --- | --- |
| 0 | No perceptible stain |
| 1 | Stain slightly perceptible |
| 2 | Visible stain but the outline is not defined |
| 3 | Stain clearly delimited but not very deep |
| 4 | Stain clearly delimited and very deep |

Test Method 5—Contact Angle Measurement

Contact angles were measured using the following procedure. 14.6 cm×6.4 cm Saltillo terra cotta tiles available from Walker Zanger are wiped with isopropyl alcohol (IPA) to remove any dust or dirt, and are allowed to dry thoroughly, for 2-3 hours. The tile is evenly divided into 10 sections and a strip of masking tape is used to partition the test area. Terra cotta tiles are twice dipped for 30 s into the application solution or dispersion to be tested, allowing a drying time of 2 min. between dips. The samples are then allowed to dry under ambient conditions for 48 hr. Three 40 microL drops of deionized water are applied onto the tiles and allowed to sit for 5 minutes at 23° C. and the contact angles are measured. A higher contact angle indicates a more repellent surface. A repellency-rating chart is used to determine contact angle using a 5 to 0 scale, with 5 being excellent and 0 representing penetration. (See the repellency-rating chart below).

| | |
| --- | --- |
| 5 = Contact angle 100-120° | 4 = Contact angle 75-90° |
| 3 = Contact angle 45-75° | 2 = Contact angle 25-45° |
| 1 = Contact angle 10-25 | 0 = Contact angle <10° |

Test Method 6—Oil Repellency for Paper

The oil repellency of paper samples were tested by using the Tappi Kit Test Procedure (TAPPI UM 557). Each test specimen was placed on a clean flat surface, test side up, being careful not to touch the area to be tested. From a height of about one inch (2.5 cm), a drop of Tappi Kit test solution from an intermediate Kit Number testing bottle was dropped onto the test area. A stopwatch was started as the drop was applied. After exactly 15 seconds, the excess fluid was removed with a clean swatch of cotton tissue and the wetted area was immediately examined. Failure was evidenced by a pronounced darkening of the specimen caused by penetration, even in a small area, under the drop. The procedure was repeated as required, making sure that drops from other Kit Number bottles fell in untouched areas. The Results were reported as the Kit Rating, which was the highest numbered solution that stood on the surface of the specimen for 15 seconds without causing failure.

The composition of Tappi Kit test solution is shown in Table 5.

TABLE 5

| | Tappi Kit Test Solution | | |
|---|---|---|---|
| Rating Number | Castor Oil (ml) | Toluene (ml) | Heptane (ml) |
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

EXAMPLES

For all Tables in the Examples section, % F indicates the percent fluorine in the application solution or dispersion unless specified otherwise.

Example 1

In a round bottom flask, 50.0 g (0.032 moles of amine) of an amino-terminated polydimethylsiloxane of formula $NH_2(CH_2)_3$—$Si(CH_3)_2$—O—$[Si(CH_3)_2$—O$]_m$—$Si(CH_3)_2$—$(CH_2)_3NH_2$ (WACKER PDMS 3345, available from Wacker-Chemie GmbH, Wacker Silicones, Munich, Germany), wherein, n and m are each defined as for Formula 1 above, and 16.8 g of diisopropylethylamine (0.13 moles) were dissolved in 50 mL of tetrahydrofuran. The reaction mass above was cooled with an ice bath. A solution of 56% propargyl bromide (27.7 g, 0.13 moles) in toluene was added dropwise to the reaction while agitating vigorously. The reaction was allowed to continue overnight at 45° C. Then, the reaction mixture was filtered and the solvent evaporated under vacuum. The resulting material was a dark yellow oil that was washed three times with 50-mL portions of water. The washed product was dissolved again in tetrahydrofuran and dried over magnesium sulfate. The solvent was evaporated under vacuum to obtain a dark yellow oil in 88% yield. The product of the reaction was tetrapropargyl polysiloxane. In a round bottom flask, 9.3 g of perfluorohexylethyl azide (0.024 moles), 10.0 g of tetrapropargyl polysiloxane prepared above (0.012 moles of alkyne) and 0.5 g of copper turnings were dissolved in 10 mL of isopropanol. The reaction mass was stirred vigorously and temperature increased to 60° C. After 24 hours, the reaction was cooled to ambient temperature and solids filtrated. Then, solvent and excess of perfluorohexylethyl azide were evaporated under vacuum to obtain a triazole-containing fluorocarbon-grafted polysiloxane product in 83% yield as dark brown wax-like material. The product was a $C_6$-tetratriazole fluorocarbon-grafted polysiloxane polymer having a formula:

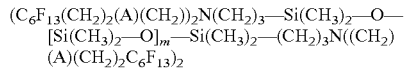

$(C_6F_{13}(CH_2)_2(A)(CH_2))_2N(CH_2)_3$—$Si(CH_3)_2$—O—$[Si(CH_3)_2$—O$]_m$—$Si(CH_3)_2$—$(CH_2)_3N((CH_2)(A)(CH_2)_2C_6F_{13})_2$ wherein,
A is triazole, and
m is defined as for Formula 1 above. The resulting dry polymer contained about 15% w/w of fluorine.

In a 100 beaker, 4.0 g of the $C_6$-tetratriazole fluorocarbon-grafted polysiloxane prepared above were dissolved in 10 mL of methyl isobutyl ketone (MIBK). Then, 20 mL of a 0.3% w/w acetic acid solution in water was added to the $C_6$-tetratriazole fluorocarbon-grafted polysiloxane polymer solution. The mixture was sonicated until it became homogeneous. The organic solvent was removed from the aqueous dispersion using a rotary evaporator and the final mass of the $C_6$-tetratriazole fluorocarbon-grafted polysiloxane polymer dispersion was adjusted to 40 g with distilled water. The final dispersion contained 8.6% solids.

The triazole-containing fluorocarbon-grafted polysiloxane dispersion of Example 1 was applied to 100% cotton fabric using the dipping process of Test Method 1. A total of 0.20 g of the triazole-containing fluorocarbon-grafted polysiloxane of Example 1 was used on 2.73 g of fabric sample with about 1.02% fluorine content by weight. The cotton fabric was tested for water repellency and oil repellency using Test Methods 2 and 3 as described above. Results are in Table 6.

The triazole-containing fluorocarbon-grafted polysiloxane dispersion of Example 1 was also applied to 100% nylon fabric using the dipping process of Test Method 1. A total of 0.09 g of the triazole-containing fluorocarbon-grafted polysiloxane of Example 1 was used on 1.29 g of fabric sample with about 0.98% fluorine content by weight. The nylon fabric was tested for water repellency and oil repellency using Test Methods 2 and 3 as described above. Results are in Table 6.

The triazole-containing fluorocarbon-grafted polysiloxane dispersion of Example 1 was applied to terra cotta tiles for stain resistance testing. The terra cotta tiles were treated with 200 g/m² of the diluted triazole-containing fluorocarbon-grafted polysiloxane dispersion. The diluted dispersion had a fluorine content of 0.30%. Stain resistance was measured using Test Method 4. Results are in Table 7.

The triazole-containing fluorocarbon-grafted polysiloxane dispersion of Example 1 was also applied to terra cotta tiles for water and oil repellency measurement using the process of Test Method 2, 3 and 5. The terra cotta tiles were treated with 200 g/m² of the diluted triazole-containing fluorocarbon-grafted polysiloxane dispersion. Terra cotta tiles were twice dipped for 30 s into the dispersion, allowing a drying time of 2 min. between dips. The samples were then allowed to dry under ambient conditions for 48 hr. Three 40 microL drops of deionized water were applied onto the tiles and allowed to sit for 5 minutes at 23° C. and the contact angles were measured. A higher contact angle indicates a more repellent surface. The diluted dispersion had a fluorine content of 0.30%. Results are in Table 8.

Comparative Example A

The amino-terminated polydimethylsiloxane of WACKER PDMS 3345, available from Wacker-Chemie GmbH, Wacker Silicones, Munich, Germany, used in Example 1 was applied to 100% cotton fabric using the dipping process of Test Method 1. A total of 0.41 g of the polydimethylsiloxane of WACKER PDMS 3345 was used on 2.69 g of fabric sample with no fluorine content. The cotton fabric was tested for water repellency and oil repellency using Test Methods 2 and 3 as described above. Results are in Table 6.

The amino-terminated polydimethylsiloxane of WACKER PDMS 3345 used in Example 1 was also applied to 100% nylon fabric using the dipping process of Test Method 1. A total of 0.26 g of the polydimethylsiloxane of WACKER PDMS 3345 was used on 1.34 g of fabric sample with no fluorine content. The nylon fabric was tested for water repellency and oil repellency using Test Methods 2 and 3 as described above. Results are in Table 6.

TABLE 6

Water- Oil- Repellency on Cotton and Nylon

| | Example 1 | | Comparative Example A | |
|---|---|---|---|---|
| | Cotton | Nylon | Cotton | Nylon |
| F % | 1.02% | 0.98% | 0 | 0 |
| Water Repellency | 8 | 6 | 0 | 2 |
| Oil Repellency | 6 | 6 | 0 | 0 |

Table 6 shows that application of amino-terminated polydimethylsiloxane of WACKER PDMS 3345 (comparative example A) to cotton and nylon fabrics did not provide significant repellency against water and oil. However, after grafting the triazole-containing fluorinated groups to the polydimethylsiloxane backbone (Example 1) water and oil repellency performance was dramatically increased on both cotton and nylon fabrics. The enhanced water and oil repellency performance was attributed to the presence of the grafted triazole-containing fluoroalkyl chains.

Comparative Example B

ZONYL 8740, a commercially available stain resist, (E.I. du Pont de Nemours and Company, Wilmington, Del.) polymer dispersion was applied to terra cotta tiles for stain resistance measurement. The terra cotta tiles were treated with 200 g/m$^2$ of the polymer dispersion. The dispersion had a fluorine content of 0.84%. Stain resistance was measured using Test Method 4. Results are in Table 7.

TABLE 7

Stain Resistance on Terra Cotta Tiles

| | Example | |
|---|---|---|
| | Example 1 | Comparative Example B |
| gF/m$^2$* | 0.60 | 1.70 |
| Coffee (black) | 3 | 4 |
| Pfeiffer Salad Dressing | 4 | 1 |
| Ketchup (Heinz) | 0 | 0 |
| Coke | 1 | 2 |
| Mustard | 4 | 3 |
| Grape Juice (purple) | 1 | 2 |
| Lemon Juice | 3 | 2 |
| Wesson Oil (soybean) | 0 | 1 |
| Bacon Grease | 1 | 3 |
| Total | 17 | 18 |

*gF/m$^2$ is amount of fluorine on substrate surface.

Table 7 shows the stain resistance data obtained for Example 1 and Comparative Example B. Application of 0.6 gF/m$^2$ of fluorinated polymer of Example 1 to Terra Cotta tiles provided better total stain resistance than Comparative Example B applied at 1.7 gF/m$^2$. This data showed that polymer of Example 1 produces similar or better performance than Comparative Example B while using 65% less fluorine on the substrate.

The tiles were also tested for water repellency and oil repellency using Test Methods 2, 3 and 5. Results are in Table 8.

TABLE 8

Repellency on Terra Cotta Tiles

| | Rating Scale | Example 1 | Comparative Example B |
|---|---|---|---|
| gF/m$^2$* | | 0.60 | 1.70 |
| Water Beading | 0-5 | 4 | 5 |
| Oil Beading | 0-8 | 4 | 4 |
| IPA Rating | 0-12 | 3 | 4 |

*gF/m$^2$ is amount of fluorine on substrate surface

Table 8 shows the water and oil beading test results in addition to the IPA rating. The results obtained for Example 1 were similar to Comparative Example B despite the much lower fluorine content of Example 1. These results suggest that Example 1 provided similar surface effects as Comparative Example B while using about 65% less fluorine.

Example 2

To a two-neck flask equipped with a Dimroth condenser was added 50 mL of tetrahydrofuran (THF), 30.0 g (0.084 mol) of WACKER 65000 VP (available from Wacker-Chemie GmbH, Wacker Silicones, Munich, Germany) and 12.6 g (0.084 mol) of diisopropylethylamine. The reactor was cooled to 0° C. using an ice bath and then 12.6 g (0.9 mol) of 80% propargyl bromide in toluene were added dropwise. After the addition was completed, the ice bath was removed and the reaction mixture was stirred overnight. Analysis by H1 NMR confirmed the formation of the desired product of propargyl-grafted WACKER 65000 VP polysiloxane. The solids were filtered and the solvent evaporated under vacuum to obtain 40.0 g of a light yellow oil.

In a 100-mL round bottom flask, 3.6 g (0.009 mol) 8-azido-1,1,1,2,2,3,3,4,4,5,5,6,6-tridecafluorooctane and 4.0 g of propargyl-grafted WACKER 65000 VP polysiloxane prepared above were dissolved in 30 mL of THF. To this solution, 0.332 g (0.0017 mol) of sodium ascorbate was dissolved in 5 mL of water and added to the reactor. Also, 0.134 g (0.0008 mol) of CuSO$_4$ was dissolved in 5.0 mL of deionized water and charged into the reactor. The solution was stirred for 24 hours at room temperature using a magnetic stirrer. Analysis by H1 NMR showed that the reaction was completed. Methyl isobutyl ketone (30 mL) was added to the reaction mass and then the solution was washed with 30 ml of water. The organic layer was separated, dried over sodium sulfate and filtered to remove the solids. The resulting polymer solution was a triazole-containing fluorocarbon-grafted WACKER 65000 VP polysiloxane having a formula:

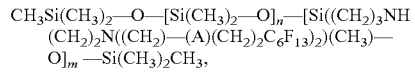

CH$_3$Si(CH$_3$)$_2$—O—[Si(CH$_3$)$_2$—O]$_n$—[Si((CH$_2$)$_3$NH(CH$_2$)$_2$N((CH$_2$)—(A)(CH$_2$)$_2$C$_6$F$_{13}$)$_2$)(CH$_3$)—O]$_m$—Si(CH$_3$)$_2$CH$_3$, wherein A is triazole group.

Then, 20 mL of a 0.3 w/w % acetic acid solution in water was added to the polymer solution and the mixture was sonicated for two minutes to get a dispersion. The organic solvents were removed under vacuum and the concentration of the dispersion adjusted to 3.8% polymers (1.2% fluorine).

In a plastic beaker, 0.6 g of the triazole-containing fluorocarbon-grafted WACKER 65000 VP polysiloxane prepared above were mixed with 100 g of water. The mixture is then sonicated for 2 minutes to obtain a dispersion that contains 0.6% solids.

The triazole-containing fluorocarbon-grafted WACKER 65000 VP polysiloxane dispersion of Example 2 was applied to 100% cotton fabric using the same procedure of Example 1. The cotton fabric was tested for water repellency and oil repellency using Test Methods 2 and 3 as described above. The same test was measured on the cotton fabric treated with WACKER 65000 VP polysiloxane. Results are in Table 9.

The triazole-containing fluorocarbon-grafted WACKER 65000 VP polysiloxane dispersion of Example 2 was also applied to 100% nylon fabric using the same procedure of Example 1. The nylon fabric was tested for water repellency and oil repellency using Test Methods 2 and 3 as described above. The same test was measured on the nylon fabric treated with WACKER 65000 VP polysiloxane. Results are in Table 9.

TABLE 9

Water- Oil- Repellency on Cotton and Nylon

| | Polymer | | | | | |
|---|---|---|---|---|---|---|
| | | | Cotton | | Nylon | |
| ID | % Solids | % Fluorine | Water | Oil | Water | Oil |
| WACKER-65000 VP | 0.6 | 0 | 2 | 0 | 2 | 0 |
| Example 2 | 0.6 | 0.2 | 7 | 6 | 8 | 7 |

Table 9 shows that application of WACKER-65000 VP (without fluorine) to cotton and nylon fabrics did not provide any significant repellency against water and oil. However, after grafting the triazole-containing fluorinated groups to the polydimethylsiloxane backbone (Example 2) water and oil repellency performance was dramatically increased on both cotton and nylon fabrics. The enhanced water and oil repellency performance was attributed to the presence of the grafted triazole-containing fluoroalkyl chains onto the polydimethylsiloxane.

The triazole-containing fluorocarbon-grafted WACKER 65000 VP polysiloxane dispersion of this Example 2 was applied to paper samples for oil repellency test using the process of Test Method 6. The paper used in the test was white 70 lb paper (bleached 50# paper) and was cut into approximately 13×13 cm squares. Results are in Table 10.

Comparative Example C

ZONYL RP solution, available from E.I. du Pont de Nemours and Company, Wilmington, Del., was applied on paper samples and tested for oil repellency using the same process of Test Method 6. Results are in Table 10.

Comparative Example D

ZONYL 9464 solution, available from E.I. du Pont de Nemours and Company, Wilmington, Del., was applied on paper samples and tested for oil repellency using the same process of Test Method 6. Results are in Table 10.

TABLE 10

Oil Repellency on Paper

| Polymer, gram/cm$^2$ | *% F Content | Kit Values | *% F Content | Kit Values |
|---|---|---|---|---|
| Untreated | 0 | 0 | 0 | 0 |
| Example 2 | 0.077 | 4 | 0.1307 | 5 |

TABLE 10-continued

Oil Repellency on Paper

| Polymer, gram/cm$^2$ | *% F Content | Kit Values | *% F Content | Kit Values |
|---|---|---|---|---|
| Comparative Example C | 0.0816 | 4 | 0.1335 | 6 |
| Comparative Example D | 0.0654 | 3 | 0.0995 | 6 |

*% F by weight on paper being tested.

Table 10 compares the oil repellency performance of Example 2 on paper against untreated paper and Comparative Examples C and D. Interestingly, Example 2 demonstrated equivalent oil repellency performance as Comparative Examples C and D that were optimized commercial products for paper. As expected, untreated paper offered no protection against oil.

The triazole-containing fluorocarbon-grafted WACKER 65000 VP polysiloxane dispersion of this Example 2 was applied to terra cotta tiles for stain resistance. The terra cotta tiles were treated with 200 g/m$^2$ of the diluted triazole-containing fluorocarbon-grafted WACKER 65000 VP polysiloxane dispersion. The diluted dispersion had a fluorine content of 0.30%. Stain resistance was measured using Test Method 4. The comparison to the ZONYL 8740 was made using the same procedure of Comparative Example B. Results are in Table 11.

TABLE 11

Stain Resistance on Terra Cotta Tiles

| | Example | |
|---|---|---|
| | Example 2 | Comparative Example B |
| gF/m$^2$* | 0.77 | 1.4 |
| Coffee (black) | 1 | 0 |
| Pfeiffer Salad Dressing | 0 | 2 |
| Ketchup (Heinz) | 1 | 1 |
| Coke | 1 | 1 |
| Mustard | 2 | 2 |
| Grape Juice (purple) | 1 | 1 |
| Lemon Juice | 0 | 0 |
| Wesson Oil (soybean) | 0 | 1 |
| Bacon Grease | 1 | 0 |
| Total | 7 | 8 |

*gF/m$^2$ is amount of fluorine on substrate surface.

Table 11 shows the stain resistance rating for Example 2 and Comparative Example B on Terra Cotta tiles. Example 2 provided slightly better total stain resistance than Comparative Example B. In most cases the individual stains rating for both samples was the same with the exception of a few. For instance, Example 2 had better resistance against salad dressing and Wesson oil stains while Comparative Example B provided better repellency against coffee and bacon grease stains. In addition to good stain resistance Example 2 also provided better fluorine efficiency than Comparative Example B since similar surface effects were obtained using 45% less fluorine.

The triazole-containing fluorocarbon-grafted WACKER 65000 VP polysiloxane dispersion of Example 2 was applied to limestone tiles for stain resistance. The limestone tiles were treated with 100 g/m$^2$ of the diluted triazole-containing fluorocarbon-grafted WACKER 65000 VP polysiloxane dispersion. The diluted dispersion had a fluorine content of 0.69%. Stain resistance was measured using Test Method 4. The comparison to the ZONYL 8740 was made using the same procedure of Comparative Example B. Results are in Table 12.

TABLE 12

Stain Resistance on Limestone Tiles

| | Example | |
|---|---|---|
| | Example 2 | Comparative Example B |
| gF/m$^2$* | 0.49 | 0.86 |
| Coffee (black) | 2 | 1 |
| Pfeiffer Salad Dressing | 1 | 2 |
| Ketchup (Heinz) | 0 | 0 |
| Coke | 2 | 1 |
| Mustard | 1 | 2 |
| Grape Juice (purple) | 2 | 2 |
| Lemon Juice | 4 | 4 |
| Wesson Oil (soybean) | 0 | 0 |
| Bacon Grease | 0 | 0 |
| Total | 12 | 12 |

*gF/m$^2$ is amount of fluorine on substrate surface.

Table 12 shows the stain resistance rating for Example 2 and Comparative Example B on Limestone tiles. Although both samples had the same rating for total stain resistance, the individual stain repellency was different in some cases. For instance, Example 2 had better resistance against salad dressing and mustard stains while Comparative Example B provided better repellency against coffee and coke stains. In addition to good stain resistance Example 2 also provided better fluorine efficiency than Comparative Example B since similar surface effects are obtained using 43% less fluorine.

The triazole-containing fluorocarbon-grafted polysiloxane dispersion of Example 2 was also applied to terra cotta tiles or limestone tiles for oil repellency measurement using the process of Test Method 3. The terra cotta tiles or limestone tiles were treated with 200 g/m$^2$, or 100 g/m$^2$, respectively, of the diluted triazole-containing fluorocarbon-grafted polysiloxane dispersion. The diluted dispersion had a fluorine content of 0.3%. Results are in Table 13.

TABLE 13

Oil Repellency on Terra cotta, or Limestone Tiles

| | Polymer ID | | | |
|---|---|---|---|---|
| | Terra Cotta Tiles | | Limestone Tiles | |
| | gF/m$^2$* | Oil Rating | gF/m$^2$* | Oil Rating |
| Example 2 | 0.77 | 6 | 0.49 | 6 |
| Comparative Example B | 1.4 | 6 | 0.86 | 6 |

*gF/m$^2$ is amount of fluorine on substrate surface.

Table 13 compares the oil repellency rating for Example 2 and Comparative Example B on Terra Cotta or Limestone tiles. Both polymers produced repellency values of 6 on the Terra Cotta or Limestone tiles. However, Example 2 required 45% and 43% less fluorine than Comparative Example B to generate the same surface effect on Terra Cotta and Limestone tiles, respectively.

What is claimed is:

1. A polymer of Formula 1:

$$(W)_a(R^2)_b—Si(R^1)_2—O—[Si(R^1)_2—O]_n—[Si(W)_c(R^1)_d(R^2)_e—O]_m—Si(R^1)_2—(W)_f(R^2)_g \qquad 1$$

wherein:
a, b, c, d, e, f and g are each independently 0 or 1, provided that (a+b) is 1, (f+g) is 1, and (c+d+e) is 2,
each $R^1$ is a $C_1$ to $C_8$ alkyl,
each $R^2$ is independently H or $C_1$ to $C_8$ alkyl, optionally containing oxygen, nitrogen, or sulfur, or a combination thereof,
n=0 to 500,
m=1 to 100,
each W is independently $$(R_f—X—A—X)_p—Y—X$$

wherein:
$R_f$ is a straight or branched perfluoroalkyl group having from about 2 to about 20 carbon atoms, or a mixture thereof, which is optionally interrupted by at least one oxygen atom,
each X is independently an organic divalent linking group having from about 1 to about 20 carbon atoms, optionally containing oxygen, nitrogen, or sulfur, or a combination thereof,
A is a 1,2,3-triazole,
p=1 to 2, and
Y is O, N, or NR wherein R is H or $C_1$ to $C_{20}$ alkyl, optionally containing oxygen, nitrogen, or sulfur, or a combination thereof.

2. The composition of claim 1 wherein $R_f$ is a perfluoroalkyl radical having the formula $F(CF_2CF_2)_n$, wherein n is 1 to about 10, or mixtures thereof.

3. The composition of claim 1 wherein each X is independently selected from the group consisting of a straight chain, branched chain or cyclic alkylene, phenyl, arylene, aralkylene, sulfonyl, sulfoxy, sulfonamido, carbonamido, carbonyloxy, urethanylene, ureylene, and combinations thereof.

4. The composition of claim 1 in the form of an aqueous dispersion or solution.

5. The composition prepared by contacting the composition of Formula (2)

$$(Z)_a(R^2)_b—Si(R^1)_2—O—[Si(R^1)_2—O]_n—[Si(Z)_c(R^1)_d(R^2)_e—O]_m—Si(R^1)_2—(Z)_f(R^2)_g \qquad (2)$$

wherein:
a, b, c, d, e, f and g are each independently 0 or 1, provided that (a+b) is 1, (f+g) is 1, and (c+d+e) is 2,
each Z is independently:

$$(HC\equiv C—X)_p—Y—X$$

each $R^1$ is a $C_1$ to $C_8$ alkyl,
each $R^2$ is independently H or $C_1$ to $C_8$ alkyl, optionally containing oxygen, nitrogen, or sulfur, or a combination thereof,
n=0 to 500,
m=1 to 100,
p=1 to 2,
each X is independently an organic divalent linking group having from about 1 to about 20 carbon atoms, optionally containing oxygen, nitrogen, or sulfur, or a combination thereof, and
Y is O, N, or NR wherein R is H or $C_1$ to $C_{20}$ alkyl, optionally containing oxygen, nitrogen, or sulfur, or a combination thereof,
with a fluorinated alkyl azide in the presence of copper metal wherein Cu(I) is the catalytic species.

6. A method of providing water repellency, alcohol repellency, oil repellency and stain resistance to substrates comprising contacting said substrate with a composition of Formula 1:

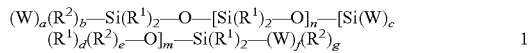   1 wherein:
- a, b, c, d, e, f and g are each independently 0 or 1, provided that (a+b) is 1, (f+g) is 1, and (c+d+e) is 2,
- each $R^1$ is a $C_1$ to $C_8$ alkyl,
- each $R^2$ is independently H or $C_1$ to $C_8$ alkyl, optionally containing oxygen, nitrogen, or sulfur, or a combination thereof,
- n=0 to 500,
- m=1 to 100,
- each W is independently

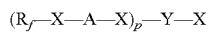

wherein:
- $R_f$ is a straight or branched perfluoroalkyl group having from about 2 to about 20 carbon atoms, or a mixture thereof, which is optionally interrupted by at least one oxygen atom,
- each X is independently an organic divalent linking group having from about 1 to about 20 carbon atoms, optionally containing oxygen, nitrogen, or sulfur, or a combination thereof,
- A is a 1,2,3-triazole,
- p=1 to 2, and
- Y is O, N, or NR wherein R is H or $C_1$ to $C_{20}$ alkyl, optionally containing oxygen, nitrogen, or sulfur, or a combination thereof.

7. The method of claim 6 wherein the composition is applied as an aqueous dispersion or solution.

8. The method of claim 6 wherein the composition is applied by means of exhaustion, spray, foam, flex-nip, nip, pad, kiss-roll, beck, skein, winch, liquid injection, overflow flood, brush, roll, spray or immersion.

9. The method of claim 6 wherein the composition is applied in the presence of at least one of
- A) an agent which provides a surface effect which is no iron, easy to iron, shrinkage control, wrinkle free, permanent press, moisture control, softness, strength, antislip, antistatic, anti-snag, anti-pill, stain repellency, stain release, soil release, water repellency, oil repellency, odor control, antimicrobial, or sun protection,
- B) a surfactant, antioxidant, light fastness agent, color fastness agent, water, pH adjuster, cross linker, wetting agent, extender, foaming agent, processing aid, lubricant, blocked isocyanate, nonfluorinated and extenders, or
- C) combinations thereof.

10. The method of claim 6 wherein the composition is applied at a rate of from about 10 to about 1000 g/M².

11. A substrate to which has been applied a composition of Formula 1:

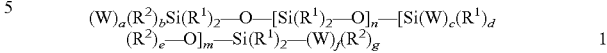   1 wherein:
- a, b, c, d, e, f and g are each independently 0 or 1, provided that (a+b) is 1, (f+g) is 1, and (c+d+e) is 2,
- each $R^1$ is a $C_1$ to $C_8$ alkyl,
- each $R^2$ is independently H or $C_1$ to $C_8$ alkyl, optionally containing oxygen, nitrogen, or sulfur, or a combination thereof,
- n=0 to 500,
- m=1 to 100,
- each W is independently

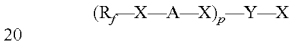

wherein:
- $R_f$ is a straight or branched perfluoroalkyl group having from about 2 to about 20 carbon atoms, or a mixture thereof, which is optionally interrupted by at least one oxygen atom,
- each X is independently an organic divalent linking group having from about 1 to about 20 carbon atoms, optionally containing oxygen, nitrogen, or sulfur, or a combination thereof,
- A is a 1,2,3-triazole,
- p=1 to 2, and
- Y is O, N, or NR wherein R is H or $C_1$ to $C_{20}$ alkyl, optionally containing oxygen, nitrogen, or sulfur, or a combination thereof.

12. The substrate of claim 11 comprising a fibrous substrate or a hard surface substrate.

13. The substrate of claim 12 which is a fiber, yarn, fabric, fabric blend, textile, nonwoven, carpet, paper or leather.

14. The substrate of claim 12 which is selected from the group consisting of a polyamide, nylon, wool, polyester, polyolefin, polyaramid, acrylic, cotton, jute, sisal, sea grass, coir, and blends thereof.

15. The substrate of claim 12 which is stone, masonry, concrete, unglazed tile, brick, porous clay, granite, tile, limestone, grout, mortar, marble, wood, gypsum board, terrazzo, and composite materials.

16. The substrate of claim 11 having a fluorine content of from about 0.05% to about 1% by weight after application of a composition of Formula (1).

* * * * *

UNITED STATES PATENT AND TRADEMARK OFFICE
CERTIFICATE OF CORRECTION

PATENT NO. : 7,638,589 B2  Page 1 of 1
APPLICATION NO. : 11/311077
DATED : December 29, 2009
INVENTOR(S) : Acosta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Ninth Day of November, 2010

David J. Kappos
*Director of the United States Patent and Trademark Office*